(12) United States Patent
Takaya

(10) Patent No.: US 10,000,252 B2
(45) Date of Patent: Jun. 19, 2018

(54) SWINGARM SUPPORT STRUCTURE

(71) Applicant: Kawasaki Jukogyo Kabushiki Kaisha, Kobe-shi, Hyogo (JP)

(72) Inventor: Satoshi Takaya, Akashi (JP)

(73) Assignee: KAWASAKI JUKOGYO KABUSHIKI KAISHA (JP)

(*) Notice: Subject to any disclaimer, the term of this patent is extended or adjusted under 35 U.S.C. 154(b) by 0 days. days.

(21) Appl. No.: 15/373,871

(22) Filed: Dec. 9, 2016

(65) Prior Publication Data
US 2017/0183055 A1 Jun. 29, 2017

(30) Foreign Application Priority Data
Dec. 24, 2015 (JP) .................................. 2015-252060

(51) Int. Cl.
*B62K 25/28* (2006.01)
*B62K 11/04* (2006.01)
*B62M 9/00* (2006.01)

(52) U.S. Cl.
CPC ............ *B62K 25/283* (2013.01); *B62K 11/04* (2013.01); *B62K 25/286* (2013.01); *B62M 9/00* (2013.01)

(58) Field of Classification Search
CPC .... B62K 25/28; B62K 25/286; B62K 25/283; B62K 11/04
See application file for complete search history.

(56) References Cited

U.S. PATENT DOCUMENTS

| | | | |
|---|---|---|---|
| 3,948,543 A | 4/1976 | MacDonald et al. | |
| 4,445,585 A | 5/1984 | Imani | |
| 4,696,363 A * | 9/1987 | Enda | B62K 19/20 180/219 |
| 5,377,776 A * | 1/1995 | Saiki | B62K 11/04 180/219 |
| 5,921,339 A | 7/1999 | Matsuura | |
| 5,984,336 A * | 11/1999 | Hanafusa | B62K 11/04 180/227 |
| 7,296,814 B2 * | 11/2007 | Miyamoto | B62K 11/04 180/219 |

(Continued)

FOREIGN PATENT DOCUMENTS

| | | |
|---|---|---|
| EP | 2130731 | 12/2009 |
| EP | 2554465 | 2/2013 |

(Continued)

OTHER PUBLICATIONS

Extended Search Report dated May 3, 2017 for Corresponding European Patent Application No. 16205433.2 (7 pages).

*Primary Examiner* — Joseph M Rocca
*Assistant Examiner* — Michael R Stabley

(57) ABSTRACT

A pair of left and right vertical frame pieces 1b, 1b constituting a part of a vehicle body frame FR extend in a vertical direction. A pair of left and right swingarm brackets 9L, 9R are fixed to the left and right vertical frame pieces 1b, 1b, respectively. A pivot 16 is supported by the swingarm brackets 9L, 9R swingably supports a swingarm 12 outward of the swingarm brackets 9L, 9R in a vehicle widthwise direction. Each of the left and right swingarm brackets 9L, 9R includes left and right opposing portions 320, 340 disposed so as to be spaced apart in the vehicle widthwise direction. The pivot 16 is supported by the left and right opposing portions 320, 340 of each of the swingarm brackets 9L, 9R.

11 Claims, 11 Drawing Sheets

(56) References Cited

U.S. PATENT DOCUMENTS

| | | | |
|---|---|---|---|
| 7,681,680 B2 * | 3/2010 | Ishikawa | B62K 11/06 180/219 |
| 8,851,496 B2 * | 10/2014 | Hedtke | B62K 11/04 180/219 |
| 9,045,191 B2 | 6/2015 | Yasuda et al. | |
| 2005/0126844 A1 * | 6/2005 | Ogura | B62K 19/00 180/311 |
| 2013/0015634 A1 | 1/2013 | Yasuda et al. | |
| 2013/0264795 A1 | 10/2013 | Sugiyama et al. | |

FOREIGN PATENT DOCUMENTS

| JP | 56-046486 | 4/1981 |
|---|---|---|
| JP | 2010-058762 | 3/2010 |

* cited by examiner

SWINGARM SUPPORT STRUCTURE

CROSS REFERENCE TO THE RELATED APPLICATION

This application is based on and claims Convention priority to Japanese patent application No. 2015-252060, filed Dec. 24, 2015, the entire disclosure of which is herein incorporated by reference as a part of this application.

BACKGROUND OF THE INVENTION

Field of the Invention

The present invention relates to a swingarm support structure configured to support, on a vehicle body frame, a swingarm supporting a rear wheel.

Description of Related Art

A swingarm support structure has been known in which a swingarm bracket supporting a swingarm is disposed inward of the swingarm in the vehicle widthwise direction (e.g., JP Laid-open Patent Publication No. 2010-058762).

However, in the case of a structure in which the swingarm bracket is disposed inward of the swingarm in the vehicle widthwise direction as disclosed in JP Laid-open Patent Publication No. 2010-058762, the swingarm bracket is required to have a higher supporting strength than in the case of a structure in which the swingarm bracket is disposed outward of the swingarm in the vehicle widthwise direction. Increasing the thickness of the swingarm bracket in order to ensure a desired supporting strength may result in a weight increase, or cause a portion having excessive strength.

SUMMARY OF THE INVENTION

It is an object of the present invention to provide a swingarm support structure that can ensure the required supporting rigidity while suppressing a weight increase.

In order to accomplish the above-described object, a swingarm support structure according to the present invention is configured to support, on a vehicle body frame, a swingarm that supports a rear wheel. The swingarm support structure includes: a pair of left and right vertical frame pieces constituting a part of the vehicle body frame and extending in an up-down direction or a vertical direction; a pair of left and right swingarm brackets fixed to the pair of left and right vertical frame pieces, respectively; and a pivot supported by the swingarm brackets and configured to swingably support the swingarm outward in a vehicle widthwise direction of the swingarm brackets. In the swingarm support structure, each of the pair of left and right swingarm brackets includes left and right opposing portions disposed so as to be spaced apart in a right-left direction or the vehicle widthwise direction, and the pivot is supported by each of the left and right opposing portions at each of the swingarm brackets.

With this configuration, each of the pair of left and right swingarm brackets includes left and right opposing portions, and the pivot configured to support the swingarm is supported by the four opposing portions. This makes it possible to increase the rigidity of a required area simply by increasing the thickness of a necessary portion of the four opposing portions, without increasing the overall thickness of the swingarm bracket. As a result, it is possible to effectively ensure the required supporting rigidity, while suppressing a weight increase.

In the present invention, the left and right opposing portions may have rigidities different with each other. This configuration effectively increases the rigidity of required one of the opposing portions, thus making it possible to suppress a weight increase.

In the present invention, the left and right vertical frame pieces may be each composed of a pipe, and each of the pair of left and right swingarm brackets may further include a coupling portion configured to couple the left and right opposing portions. According to this configuration, the left and right opposing portions are coupled by the coupling portion and are fixed to the pipe, and therefore, deformation of the opposing portions is effectively inhibited, resulting in increased supporting rigidity for the swingarm.

In the present invention, the left and right vertical frame pieces may extend to locations below the pivot. According to this configuration, the vertical frame pieces increase the supporting rigidity of the opposing portions for the swingarm.

According to the present invention, a rigidity of one swingarm bracket of the pair of left and right swingarm brackets may be set to be higher than a rigidity of the other swingarm bracket, the one swingarm bracket being located on a side on which a power transmission mechanism configured to transmit power from a drive source to the rear wheel is disposed. With this configuration, although a high load is applied to the one swingarm bracket from the power transmission mechanism, this swingarm bracket can easily withstand the load because of its increased rigidity. In this case, for example, a projected area of the one swingarm bracket may be set to be larger in side view than a projected area of the other swingarm bracket. A thickness of one opposing portion of the left and right opposing portions of the other swingarm bracket may be set to be larger than a thickness of the other opposing portion, the one opposing portions being located outward in the vehicle widthwise direction.

In the present invention, preferably, the swingarm support structure may further include a cross member extending in the vehicle widthwise direction and configured to couple together the opposing portions, located inward in the vehicle widthwise direction, of the left and right swingarm brackets, and a vehicle-body-mounted component may be supported by the cross member. The vehicle-body-mounted component includes any component mounted directly or indirectly on the vehicle body structure. According to this configuration, fitting members are disposed inward of the swingarm brackets, and therefore, the fitting members cannot be easily seen from the outside, thus achieving a good appearance.

In the present invention, a fixing portion configured to support a vehicle-body-mounted component may be formed on the swingarm bracket. Examples of the vehicle-body-mounted component include an exhaust muffler and a linkage for a rear suspension. Examples of the fixing portion include a weld nut and a boss. According to this configuration, each of the swingarm brackets includes the left and right opposing portions, and therefore, it is possible to increase the rigidity of only the opposing portion on which the fixing portion is formed. This makes it possible to increase the rigidity of a required area, without increasing the overall thickness of the swingarm bracket.

In the present invention, a step stay on which a foot of a driver is to be placed may be coupled to the pivot. This configuration allows fixation of the pivot and fixation of the step stay to be performed in common, thus making it possible to reduce the number of components and also achieve a weight reduction.

In the present invention, a thickness of each of the opposing portions around the pivot may be set to be larger than a thickness of the remaining portions thereof. According to this configuration, increasing the thickness around the pivot facilitates welding of a pivot pipe to the opposing portions. Partially increasing the thicknesses of the opposing portions can reduce the weights of the swingarm brackets, while increasing the strength of a required area, without increasing the overall thicknesses of the swingarm brackets.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the drawings. As used herein, "left side" and "right side" refer to left and right sides as viewed from a rider riding a motorcycle.

Figure 1:
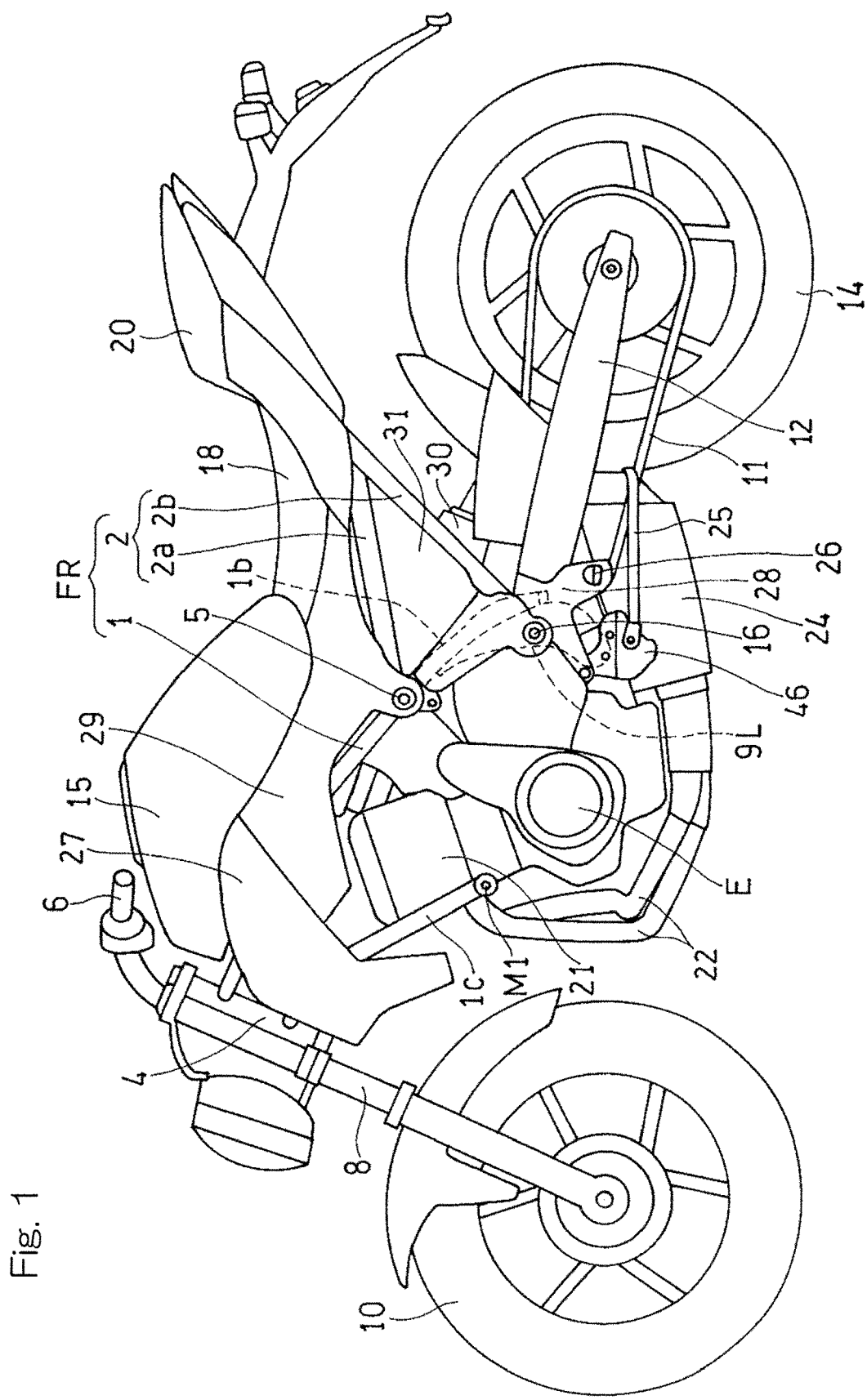
FIG. 1 is a side view showing a motorcycle including a swingarm support structure according to a first embodiment of the present invention.

FIG. 1 is a side view of a motorcycle including a motorcycle swingarm support structure according to a first embodiment of the present invention. A vehicle body frame FR of the motorcycle includes a main frame 1 that forms a front half thereof and a rear frame 2 that forms a rear half thereof.

Figure 2:
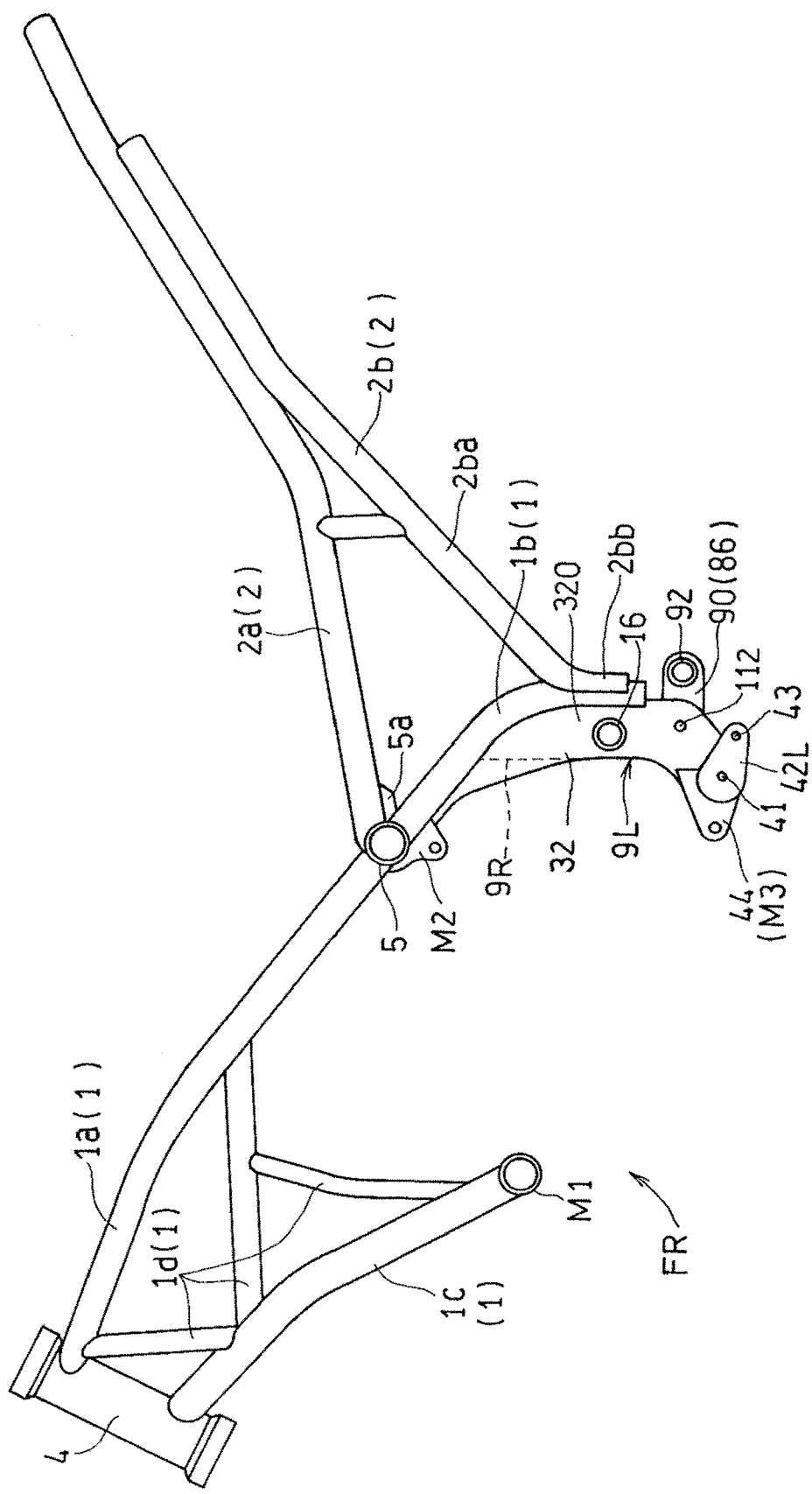
FIG. 2 is a side view showing a vehicle body frame of the motorcycle.
Figure 3:
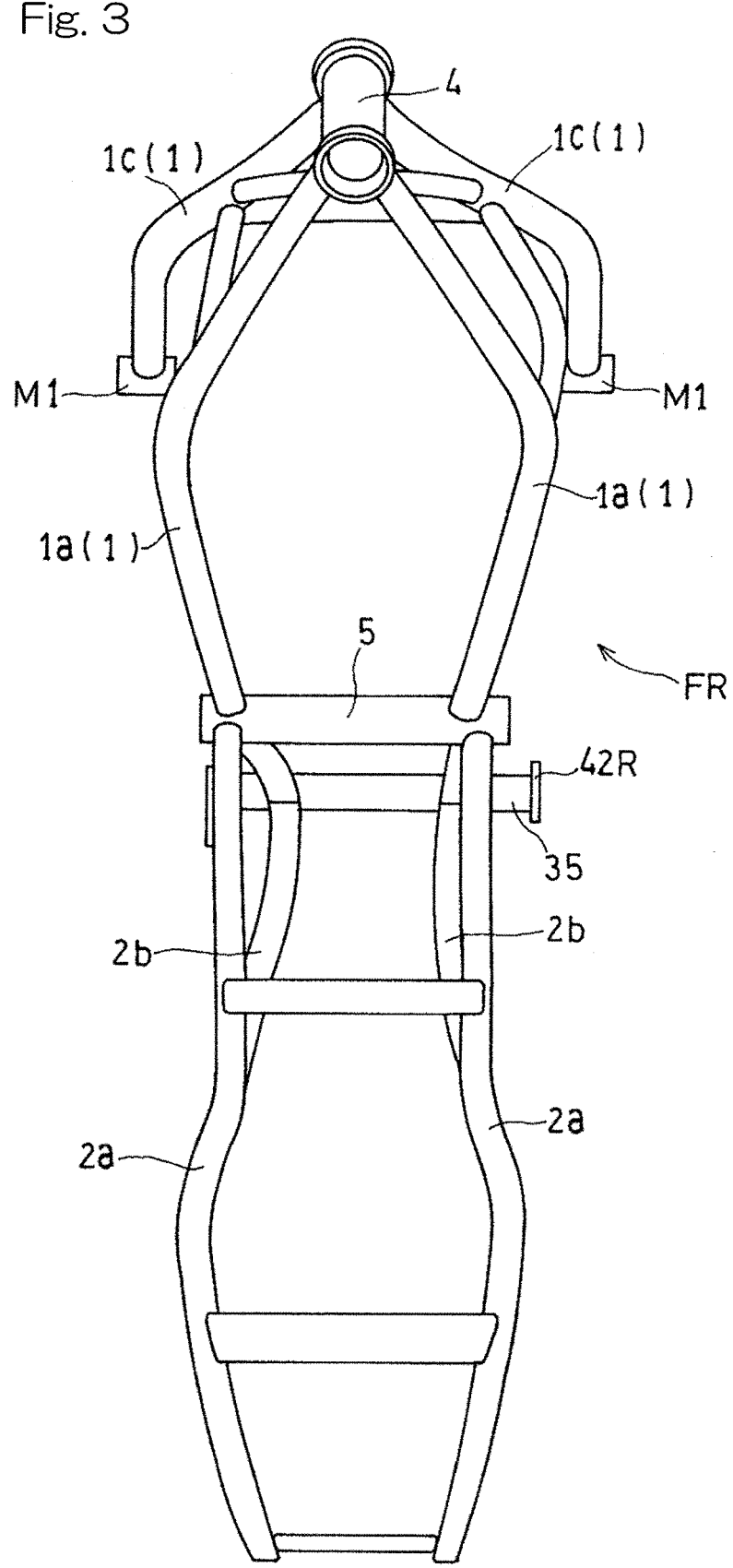
FIG. 3 is a plan view showing the vehicle body frame.

FIG. 2 is a side view of the vehicle body frame, and FIG. 3 is a plan view of the vehicle body frame. The main frame 1 includes a pair of left and right main frame pieces 1a, 1a extending obliquely downward and rearward from upper portion of a head pipe 4 at a front end thereof. An upper cross member 5 extending in a right-left direction or vehicle widthwise direction is provided at the rear ends of the main frame pieces 1a. The main frame 1 further includes a pair of left and right vertical frame pieces 1b, 1b extending downward from the upper cross member 5. The main frame 1 also includes a pair of left and right under frame pieces 1c, 1c extending obliquely downward and rearward from a lower portion of the head pipe 4. The main frame pieces 1a, 1a and the under frame pieces 1c, 1c are coupled by a plurality of reinforcement members 1d.

The rear frame 2 includes a pair of left and right seat rails 2a, 2a extending rearward from the upper cross member 5, and a pair of left and right reinforcement rails 2b, 2b extending obliquely upward and rearward from lower end portions of the vertical frame pieces 1b, 1b and coupled to the seat rails 2a, 2a. The members 1a, 1b, 1c, 1d, 2a, and 2b constituting the vehicle body frame FR are each composed of a pipe, and are coupled to each other by welding. The pipe is made of steel, for example.

As shown in FIG. 1, a front fork 8 is pivotably supported by the head pipe 4 through a steering shaft (not shown). A steering handle 6 is fixed to an upper end portion of the front fork 8. A front wheel 10 is attached to a lower end portion of the front fork 8.

A pair of left and right swingarm brackets 9L, 9R are provided on one side of the left and right vertical frame pieces 1b, 1b shown in FIG. 2 in the front-rear direction or longitudinal direction of the motorcycle (in the present embodiment, on the front side thereof). The swingarm brackets 9L, 9R are fixed to the vertical frame pieces 1b, 1b by welding. As shown in FIG. 1, a swingarm 12 is supported so as to be swingable in an up-down direction or vertical direction about a pivot 16 attached to the swingarm brackets 9L, 9R. At a rear end portion of the swingarm 12, a rear wheel 14 is rotatably supported. The details of the swingarm brackets 9L, 9R will be described later.

A front portion of the swingarm 12 includes two arm portions spaced apart in the vehicle widthwise direction, and a cross portion that couples rear portions of the two arm portions. The left and right swingarm brackets 9L, 9R are disposed between the two arm portions of the swingarm 12.

An engine E serving as a drive source is disposed below the main frame pieces 1a and frontward of the vertical frame pieces 1b, and is attached to the main frame 1. More specifically, the engine E is attached to the vehicle body through first mount portions M1 provided at the lower ends of the under frame pieces 1c as shown in FIG. 2, second mount portions M2 provided in the vicinity of the upper cross member 5, and third mount portions M3 provided at lower ends of the swingarm brackets 9L, 9R. The engine E drives the rear wheel 14 through a power transmission mechanism 11. In the present embodiment, a drive chain is used as the power transmission mechanism 11. In the present embodiment, the drive chain (power transmission mechanism) 11 is disposed on the left side of the vehicle body.

Exhaust pipes 22 are connected to exhaust ports (not shown) provided on the front surface of a cylinder 21 of the engine E. The exhaust pipes 22 extend downward at the front of the engine E, and are then connected to an exhaust muffler 24 disposed rearward and downward of the engine E. A side stand 25 that supports the vehicle body in a slanting position during parking is disposed on the left side of the vehicle body. The side stand 25 is supported by the left swingarm bracket 9L.

A fuel tank 15 is disposed above the main frame pieces 1b of the main frame 1. A rider seat 18 and a passenger seat 20 are supported by the seat rails 2a of the rear frame 2. A pair of left and right foot steps 26 on which the feet of the rider are to be placed are disposed on opposite sides of the vehicle body. The foot steps are respectively supported by the swingarm brackets 9L, 9R, respectively, through step stays 28. A rear suspension 30 that absorbs shock received by the rear wheel 14 from a road surface is suspended between the rear wheel 14 and the vehicle body frame FR. In the present embodiment, a single rear suspension 30 is connected between the vehicle body frame FR and the swingarm 12.

The area below a front portion of the fuel tank 15 is covered by a pair of left and right shrouds 27. The area below a central portion and a rear portion of the fuel tank 15 and the area below the rider seat 18 are covered by an upper side cover 29. The swingarm brackets 9L, 9R and a rear portion of the engine E are covered by a lower side cover 31.

The left and right swingarm brackets 9L, 9R have shapes substantially symmetrical to each other. First, the left swingarm bracket 9L will be described as a representative example, and the differences between the left and right swingarm brackets 9L, 9R will be described separately.

Figure 4:
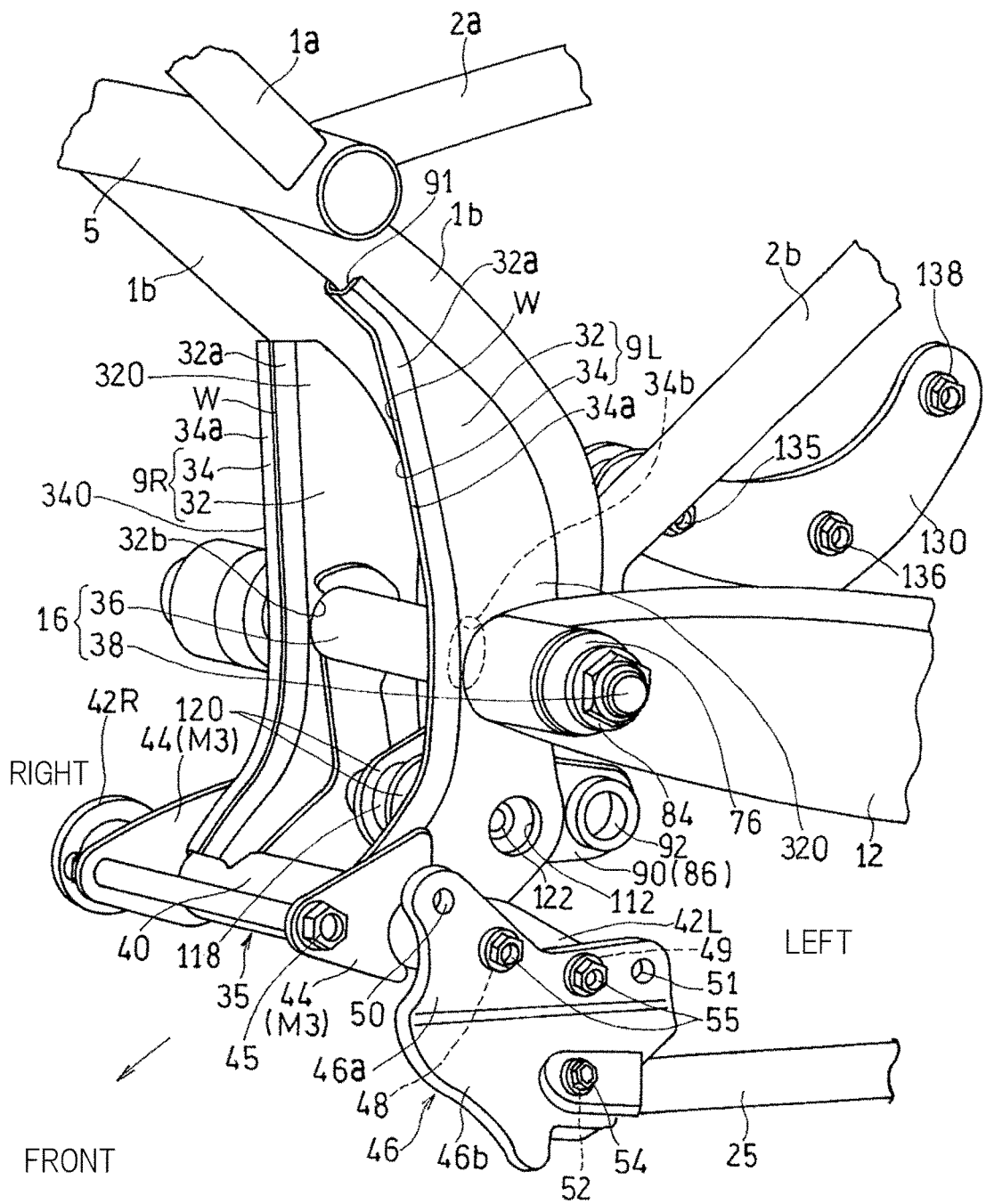
FIG. 4 is a perspective view showing the swingarm support structure from which steps are omitted.

As shown in FIG. 4, the swingarm bracket 9L is formed by joining left and right bracket halves 32, 34 that are divided in two in the vehicle widthwise direction. The left and right bracket halves 32, 34 are each formed of a sheet metal whose flat surface faces directed in the vehicle widthwise direction, and rear edges thereof are fixed to the corresponding vertical frame piece 1*b* by welding. Front edges of the left and right bracket halves 32, 34 are bent in the vehicle widthwise direction so as to form a coupling portions 32*a*, 34*a*, and edges of the coupling portions 32*a*, 34*a* are joined by welding W. The left and right swingarm brackets 9L, 9R are open on the lower side. This can reduce the weights of the swingarm brackets 9L, 9R, and allows a coating material to be discharged through the opening during coating after completion of welding of the main frame 1.

In other words, each of the left and right swingarm brackets 9L, 9R includes left and right plate-like opposing portions 320, 340 that are opposed so as to be spaced apart in the vehicle widthwise direction, and the left and right opposing portions 320, 340 are coupled by the plate-like coupling portions 32*a*, 34*a* extending in the vehicle widthwise direction. In the present embodiment, body portions of the left and right bracket halves 32, 34, excluding the coupling portions 32*a*, 34*a*, constitute the opposing portions 320, 340. The coupling portions 32*a*, 34*a* may be provided separately from the opposing portions 320, 340. A lower cross member 35 extending in the vehicle widthwise direction is fixed to lower front ends of the swingarm brackets 9L, 9R by welding. The lower cross member 35 is formed of a pipe, and couples the left and right swingarm brackets 9L, 9R.

The pivot 16 swingably supports the swingarm 12 outward of the swingarm brackets 9L, 9R in the vehicle widthwise direction. The pivot 16 includes a pivot pipe 36 inserted through the swingarm brackets 9L, 9R, and a pivot shaft 38 (FIG. 8) inserted through the pivot pipe 36.

Pipe insertion holes 32*b*, 34*b* through which the pivot 16 is inserted are formed in the respective four bracket halves 32, 32, 34, 34. The pivot 16 is inserted through the four pipe insertion holes 32*b*, 34*b*, and the pivot pipe 36 of the pivot 16 is fixed to each of the four bracket halves 32, 32, 34, 34 by welding. In other words, the pivot 16 is supported by each of the left and right opposing portions 320, 340 at each of the swingarm brackets 9L, 9R. The support structure for the pivot 16 will be described later. The vertical frame pieces 1*b* extend to locations below the lower ends of the pipe insertion holes 32*b*, 34*b*, that is, the lower end of the pivot 16.

The two opposing portions 320, 340 that oppose each other are formed of different members with each other, and are formed integrally by connecting such different members. This allows the thicknesses at the left side and the right side to be different from one another, or the shapes of the opposing portions 320, 340 to be different from one another. As a result, it is easy to ensure the rigidity of a required portion while preventing excessive rigidity.

The coupling portions 32*a*, 34*a* are disposed in the longitudinal direction relative to the corresponding vertical frame piece 1*b*, in the present embodiment, frontward of the corresponding vertical frame piece 1*b* so as to be spaced apart. The opposing portions 320, 340 are disposed between the coupling portions 32*a*, 34*a* and the vertical frame piece 1*b* in the longitudinal direction. The opposing portions 320, 340 couple the coupling portions 32*a*, 34*a* to the vertical frame piece 1*b*.

The pivot 16 is disposed above the lower end of the vertical frame piece 1*b* and between the vertical frame piece 1*b* and the coupling portions 32*a*, 34*a* in the longitudinal direction. The vertical frame pieces 1*a*, 1*b* are each formed of a pipe member having a cylindrical cross section. The pair of left and right reinforcement rails 2*b* each include a pipe portion 2*ba* having a cylindrical cross section and a connection portion 2*bb* located frontward of the pipe portion 2*ba*. The connection portion 2*bb* has a shape formed by deforming a cylindrical pipe in the axial direction, and is formed in a circular arc shape that protrudes rearward. The connection portion 2*bb* is located so as oppose a lower portion of the vertical frame piece 1*b*, is formed in a shape conforming to the outer shape of the vertical frame 1*b*, and is connected to the lower portion of the vertical frame piece 1*b* by welding. The lower ends of the reinforcement rail 2*b* and the vertical frame 1*b* are located at positions lower than the upper end or the center of the pivot 16. This increases the supporting rigidity for the pivot 16.

The swingarm brackets 9L, 9R are each formed to have a substantially U-shaped cross section perpendicular to the vertical direction, and extend in the vertical direction. The swingarm brackets 9L, 9R each have an opening 91 that is open rearward. The opening 91 of each of the swingarm brackets 9L, 9R is disposed so as to be directed to the vertical frame piece 1*b* to which the swingarm bracket is connected. In the present embodiment, the openings 91 are formed at rear edges of the swingarm brackets 9L, 9R. Each opening 91 extends along the corresponding vertical frame piece 1*b* so as be able to come into contact with the vertical frame piece 1*b* in the vertical direction. A contact portion is defined where the opening 91 and the vertical frame piece 1*b* come into contact with each other, and the swingarm brackets 9L, 9R and the vertical frame pieces 1*b* are joined with each other at such a contact portion by welding. In the present embodiment, the vertical frame pieces 1*b* are formed so as to extend in the vertical direction and be curved in the longitudinal direction. Thus, rear end portions of the openings 91 are formed along the vertical frame pieces 1*b* so as to extend in the vertical direction and be curved in the longitudinal direction.

The openings 91 of the swingarm brackets 9L, 9R are each formed by an end portion of an outer member located outward in the vehicle widthwise direction and an end portion of an inner member located inward in the vehicle widthwise direction. The inner member and the outer member are disposed so as to be spaced apart in the vehicle widthwise direction. In the present embodiment, the outer member and the inner member are formed as the opposing portions 320, 340 of the swingarm brackets 9L, 9R. The interval between the inner member and the outer member in the vehicle widthwise direction is smaller than the interval between the respective vertical frame pieces 1b, 1b in the vehicle widthwise direction. This allows the vertical frame pieces 1b and the swingarm brackets 9L, 9R to be directly joined by welding, without providing any connecting members therebetween.

Each inner member is joined by welding at a position that opposes an inner side portion of the corresponding vertical frame piece 1b in the vehicle widthwise direction. Each outer member is joined by welding at a position located inward, in the vehicle widthwise direction, of an outer side portion of the vertical frame piece 1b in the vehicle widthwise direction. This can reduce the dimensions of the swingarm brackets 9L, 9R in the vehicle widthwise direction. Since the inner member and the outer member are welded across the vertical direction, from upper end portions thereof to lower end portions of the vertical frame pieces 1b, it is possible to increase the welding length, thus achieving high connection rigidity.

Each of the bracket halves 32, 34 is formed to have a substantially L-shaped cross section perpendicular to the vertical direction. As described above, the bracket halves 32, 34 are formed in L-shapes respectively including the opposing portions 320, 340 and the coupling portions 32a, 34a that are bent relative to the opposing portions 320, 340. Step portions, in which steps are created in the swingarm brackets 9L, 9R in the longitudinal direction, are formed in portions where the coupling portions 32a, 34a of the bracket halves 32, 34 located outward in the vehicle widthwise direction and the coupling portion 34a, 32a of the bracket halves 34, 32 located inward in the vehicle widthwise direction overlap each other.

The coupling portions 32a, 34a of the bracket halves 32, 34 located outward in the vehicle widthwise direction are formed so as to partially cover the coupling portion 34a, 32a of the bracket halves 34, 32 located inward in the vehicle widthwise direction from the front. This allows the step portions to be easily concealed by the bracket halves 32, 34 located outward in the vehicle widthwise direction, making it possible to prevent the step portions from being noticeable from the outer side in the vehicle widthwise direction. For example, in the case of performing welding along the step portions, it is possible to prevent weld beads from being noticeable, thus enhancing the appearance.

Since the pair of coupling portions 32a, 34a are welded across the vertical direction, from upper end portions to lower end portions thereof, it is possible to increase the welding length, thus achieving high connection rigidity. Lower end portions of the pair of bracket halves 32, 34 are welded to the lower cross member 35. Specifically, the pair of bracket halves 32, 34 are welded to the lower cross member 35 across the longitudinal direction. The pivot pipe 36 and each of the bracket halves 32, 34 are welded.

Since the bracket halves 32, 34 are coupled to the vertical frame piece 1b, the lower cross member 35 and the pivot pipe 36 in this manner, the pair of bracket halves 32, 34 have an increased rigidity and thus are prevented from being deformed even when the thicknesses thereof are reduced.

Of the left and right swingarm brackets 9L, 9R, the rigidity of the left swingarm bracket 9L at which the power transmission mechanism 11 is disposed is set to be higher than the rigidity of the right swingarm bracket 9R. More specifically, as shown in FIG. 2, the projected area of the left swingarm bracket 9L is set to be larger in side view than the projected area of the right swingarm bracket 9R. In addition, the thickness of the left swingarm bracket 9L is set to be larger than the thickness of the right swingarm bracket 9R.

An upper end portion of the left swingarm bracket 9L extends to a location higher than an upper end portion of the right swingarm bracket 9R. The front edge of an upper portion of the left swingarm bracket 9L extends frontward of the front edge of an upper portion of the right swingarm bracket 9R. The portions of the swingarm brackets 9L, 9R that are located below the upper end of the pivot 16 are formed to have the same shape in side view. The welding length between the vertical frame piece 1b and the left swingarm bracket 9L and the welding length between the coupling portions 32a, 34a of the left swingarm bracket 9L are set to be longer than those at the right swingarm bracket 9R.

The left and right bracket halves (opposing portions 320, 340) 32, 34 have rigidities different with each other. More specifically, in the present embodiment, the thickness of the bracket half 32 located outward (left side) in the vehicle widthwise direction of the left swingarm bracket 9L on the side closer to the power transmission mechanism 11 is set to be larger than the thickness of the other three bracket halves 32, 34, 34. This effectively enhances the supporting strength of a portion of the swingarm bracket 9L in the vicinity of the power transmission mechanism 11 to which portion the highest load is applied.

Figure 5:
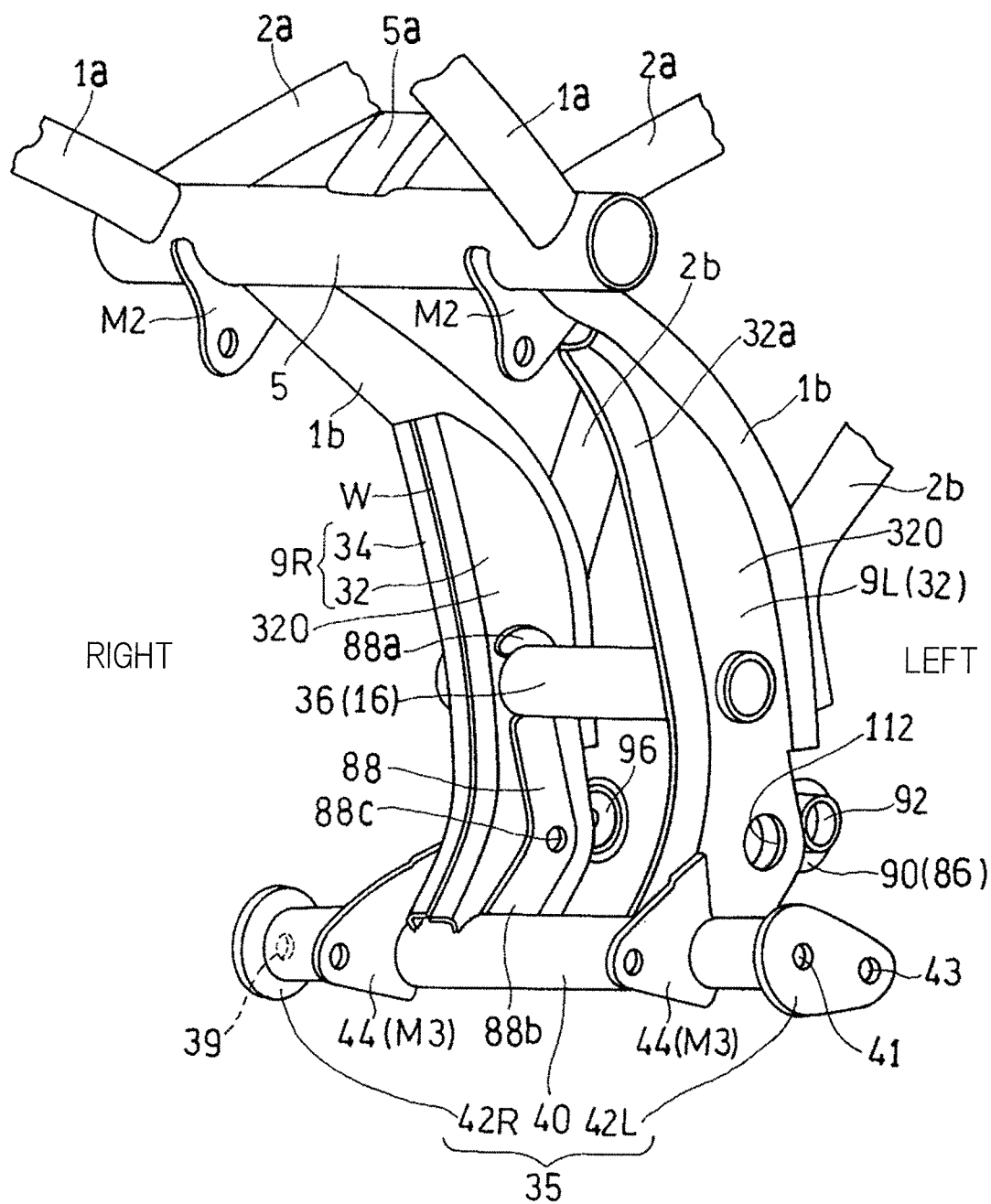
FIG. 5 is a front perspective view showing a lower portion of the vehicle body frame.

As shown in FIG. 5, the lower cross member 35 includes a pipe member 40 extending in the vehicle widthwise direction, and left and right closing members 42L, 42R that are formed of sheet metals fixed to opposite ends of the pipe member 40 by welding. The pipe member 40 has a dimension that is sufficiently larger than the dimension of the pivot 16 in the vehicle widthwise direction. The right closing member 42R has a circular shape concentric with the pipe member 40, and a first threaded hole 39 directed in the vehicle widthwise direction (right-left direction) is formed in a central portion of the right closing member 42R.

The left closing member 42L has a substantially oblong shape extending obliquely downward and rearward from the pipe member 40 in side view. A second threaded hole 41 directed in the vehicle widthwise direction is formed in a front portion of the left closing member 42L, more specifically, at a position corresponding to the center line of the pipe member 40. Furthermore, a third threaded hole 43 directed in the vehicle widthwise direction is formed in a rear portion of the left closing member 42L. In the present embodiment, the first to third threaded holes 39, 41, 43 are formed of weld nuts.

Engine brackets 44, 44 that protrude frontward are fixed by welding to the pipe member 40 of the lower cross member 35 outward of the left and right swingarm brackets 9L, 9R. The engine brackets 44, 44 constitute the third mount portions M3.

The left and right engine brackets 44, 44 are welded to the left and right swingarm brackets 9L, 9R, respectively. A rear portion of a lower portion of the engine E (FIG. 1) is supported by the engine bracket 44 through a bolt 45 (FIG. 4). In other words, the left and right swingarm brackets 9L, 9R are coupled through the bolt 45 and the engine brackets 44, 44. This increases the rigidity of the swingarm brackets 9L, 9R. Furthermore, since the engine bracket 44 is connected to the left bracket half 32 of the left swingarm bracket 9L, it is possible to prevent the bracket half 32 from being deformed by a chain load.

The side stand 25 is attached to the left closing member 42L through a stand bracket 46 shown in FIG. 4. The stand bracket 46 includes an upper half 46a having a surface directed in the vehicle widthwise direction and a lower half 46b having a surface directed obliquely upward. An upper end of the lower half 46b is connected to a lower end of the upper half 46a.

First and second bolt insertion holes 48, 49 directed in the vehicle widthwise direction are respectively formed in the upper half 46a of the stand bracket 46 at positions corresponding to the second and third threaded holes 41, 43 (FIG. 5), of the left closing member 42L. Furthermore, a fourth threaded hole 50 directed in the vehicle widthwise direction is formed in the upper half 46a of the stand bracket 46 and frontward of and above the front first bolt insertion hole 48, and a fifth threaded hole 51 directed in the vehicle widthwise direction is formed in the upper half 46a of the stand bracket 46 and rearward of the rear second bolt insertion hole 49.

A stand attachment hole 52 is formed in the lower half 46b of the stand bracket 46. By inserting a bolt 54 through the stand attachment hole 52, the side stand 25 is pivotably attached to the stand bracket 46. After bolts 55, 55 have been inserted through the first and second bolt insertion holes 48, 49 defined in the upper half 46a of the stand bracket 46 from the outer side in the vehicle widthwise direction, the bolts 55, 55 are fastened to the second and third threaded holes 41, 43 (FIG. 5) defined in the left closing member 42L. Consequently, the side stand 25 is pivotably supported by the vehicle body through the stand bracket 46. The foot steps 26 and the step stays 28 are omitted from FIG. 4.

Figure 7:
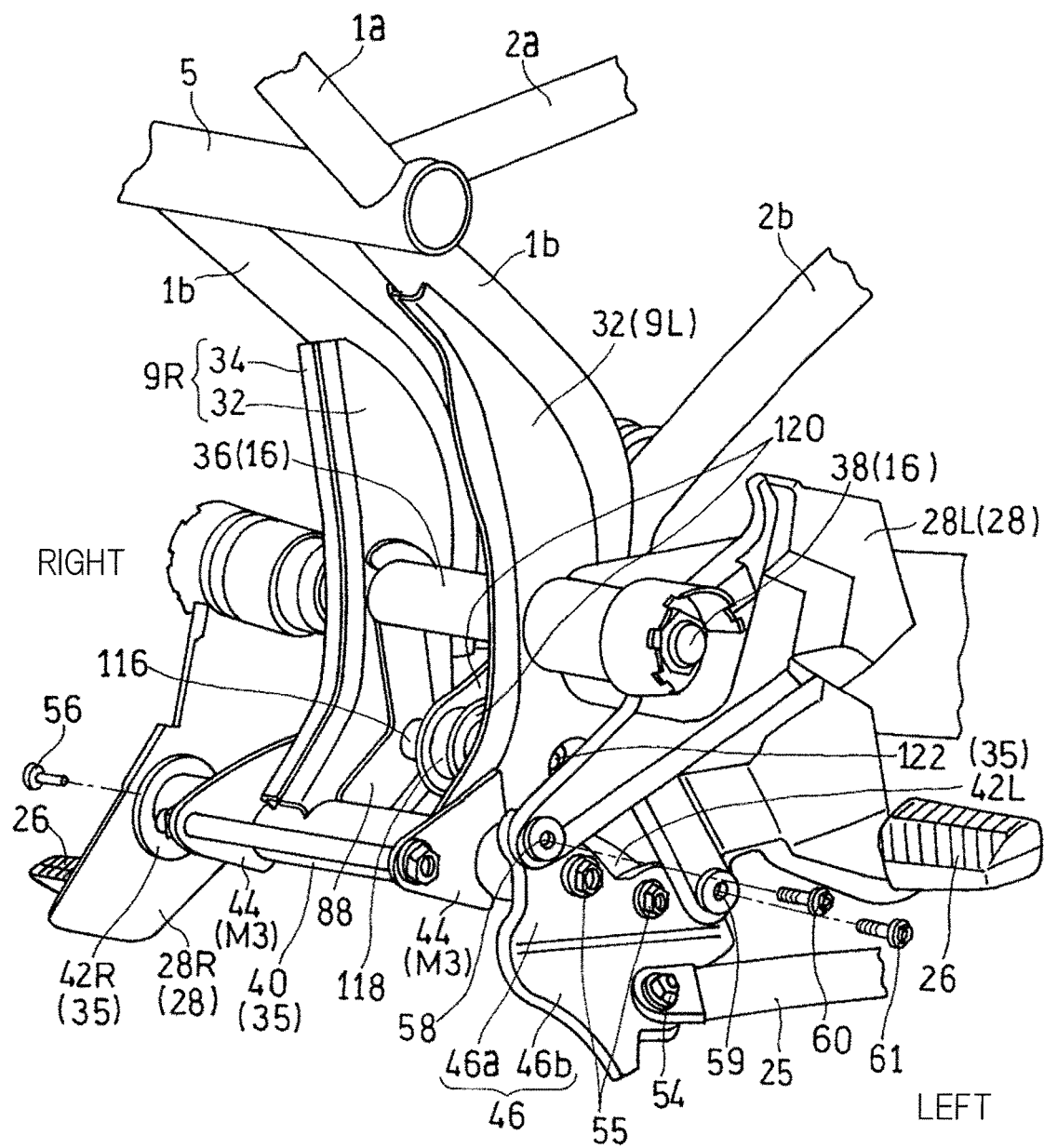
FIG. 7 is a perspective view showing the swingarm support structure.

FIG. 7 shows a state in which the foot steps 26 and the step stays 28 are additionally provided to FIG. 4. As shown in FIG. 7, a front portion of a right step stay 28R is supported by the right closing member 42R of the lower cross member 35. More specifically, after a bolt 56 has been inserted through a insertion hole (not shown) formed in the right step stay 28R from the outer side in the vehicle widthwise direction, the bolt 56 is fastened to the first threaded hole 39 (FIG. 5) of the right closing member 42R. Consequently, the front portion of the right step stay 28R is supported by the right closing member 42R of the lower cross member 35. An upper portion of the right step stay 28R is supported by the swingarm brackets 9L, 9R by a structure described later.

A front portion of a left step stay 28L is supported by the left closing member 42L of the lower cross member 35 through the stand bracket 46. More specifically, third and fourth bolt insertion holes 58, 59 directed in the vehicle widthwise direction are formed in a front end portion of the left step stay 28L at positions corresponding to the fourth and fifth threaded holes 50, 51 (FIG. 4), respectively, of the upper half 46a of the stand bracket 46. After bolts 60, 61 have been inserted through the third and fourth bolt insertion holes 58, 59 from the outer side in the vehicle widthwise direction, the bolts 60, 61 are fastened to the fourth and fifth threaded holes 50, 51 (FIG. 4) of the upper half 46a of the stand bracket 46. Consequently, the front portion of the left step stay 28L is supported by the left closing member 42L of the lower cross member 35 through the stand bracket 46.

In this manner, the left step stay 28L at which the power transmission mechanism 11 is disposed is supported by the stand bracket 46 by using the bolts 60, 61, and thereby, a separate supporting member through which the step stay 28L is supported by the vertical frame 1b is omitted. Since this simplifies the support structure for the step stay 28L, the left step stay 28L can be supported by the stand bracket 46, and the left step stay 28L can be disposed outward of the stand bracket 46 while preventing interference with the power transmission mechanism 11.

As described above, a fixing portion for fixing a lower portion of the step stay 28L is formed on the stand bracket 46. Accordingly, the attachment position of the step stay 28L can be changed by changing the shape of the stand bracket 46, thus making a design change easier than when the closing member 42L is changed. By performing fixation of an upper portion of the step stay 28L in common with the fixation of the pivot 16, it is not necessary to use a bracket for fixing the step stay 28L above the pivot 16. This allows the space above the step stay 28L to be effectively used, and also allows the step stay 28L to be disposed inward in the vehicle widthwise direction.

Figure 8:
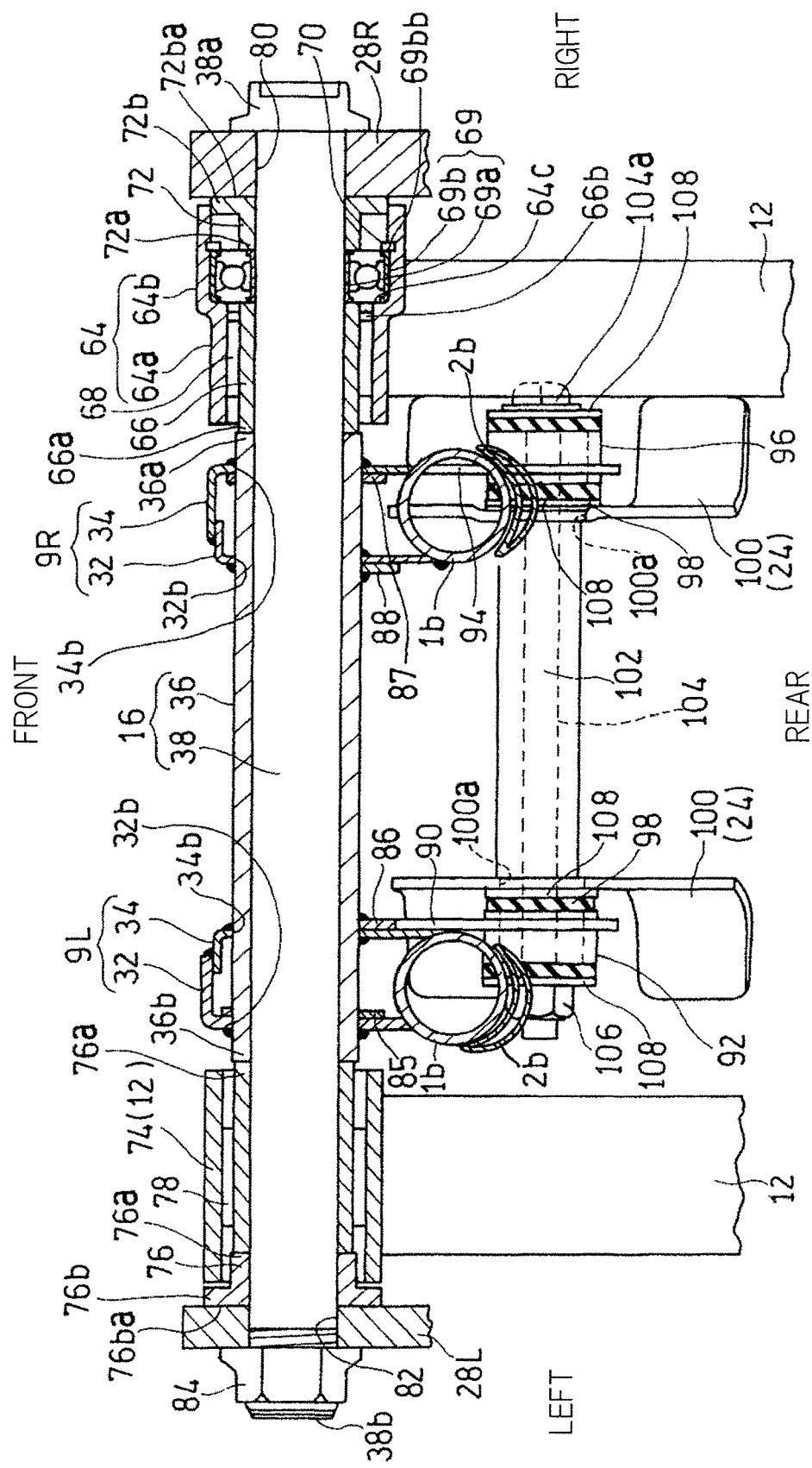
FIG. 8 is a cross-sectional view showing the swingarm support structure.

The support structure for the upper portions of the left and right step stays 28L, 28R will be described in conjunction with the support structure for an upper portion of the swingarm 12. As shown in FIG. 8, the pivot pipe 36 of the pivot 16 is inserted through the pipe insertion holes 32b, 34b, which are provided in the bracket halves 32, 34 of the left and right swingarm brackets 9L, 9R so as to be directed in the vehicle widthwise direction. In this state, the pivot pipe 36 is fixed to the four bracket halves 32, 32, 34, 34 by welding.

The pivot shaft 38 is inserted through the pivot pipe 36. The pivot shaft 38 of the present embodiment is formed of a threaded body including a head 38a at one end and an externally screw portion 38b at the other end. A pivot portion 64 at the front end of the right swingarm 12 has the shape of a stepped cylinder including a smaller diameter portion 64a located inward in the vehicle widthwise direction and a larger diameter portion 64b located outward in the vehicle widthwise direction. A left end portion 66a of a cylindrical collar 66 is in contact with one end portion (right end portion) 36a of the pivot pipe 36. The collar 66 is accommodated in the smaller diameter portion 64a of the pivot portion 64 of the right swingarm 12, and is pivotably supported on the inner circumferential surface of the smaller diameter portion 64a through a roller bearing 68.

An annular ball bearing 69 is interposed between a right end portion 66b of the collar 66 and a tubular flanged collar 72 on the right side. A flange portion 72b is provided at the right end of the flanged collar 72. The outer diameter of the flange portion 72b and the inner diameter of the larger diameter portion 64b of the pivot portion 64 at the right swingarm 12 have substantially the same dimension. A right end face 72ba of the flange portion 72b is located slightly rightward (outward in the vehicle widthwise direction) of the right end of the larger diameter portion 64b. The upper portion of the right step stay 28R is in contact with the right end face 72ba of the flange portion 72b in the axial direction.

The position of an outer ring 69b of the ball bearing 69 is restricted in the axial direction by a stepped surface 64c between the smaller diameter portion 64a and the larger diameter portion 64b of the pivot portion 64 at the right swingarm 12, and a retaining ring 70 locked to the larger diameter portion 64b. In this manner, the ball bearing 69 is accommodated inside the larger diameter portion 64b of the pivot portion 64 at the right swingarm 12, and is interposed between the pivot shaft 38 and the inner circumferential surface of the larger diameter portion 64b.

A pivot portion 74 at the front end of the left swingarm 12 has the shape of a cylinder having a uniform outer diameter. A right end portion 76a of a cylindrical flanged collar 76 is in contact with the other end portion (left end portion) 36b of the pivot pipe 36. A flange portion 76b is formed at a left end portion of the flanged collar 76. The outer diameter of the flange portion 76b is larger than the inner diameter of the pivot portion 74 at the left swingarm 12. A roller bearing 78 is interposed between the outer circumferential surface of the flanged collar 76 and the inner surface of the pivot portion 74 at the left swingarm 12. In other words, the flanged collar 76 is accommodated in the pivot portion 74 at the right swingarm 12 excluding the flange portion 76b, and is pivotably supported on the inner circumferential surface of the pivot portion 74 through the roller bearing 78. The upper portion of the left step stay 28L is in contact with a left end face 76ba of the flange portion 76b in the axial direction.

The pivot shaft 38 is inserted from the right side, which is outward in the vehicle widthwise direction. More specifically, the pivot shaft 38 is inserted through the fifth bolt insertion hole 80 provided in the right step stay 28R, the flanged collar 72, the ball bearing 69 and the collar 66 in this order, and is thereafter inserted into the pivot pipe 36. The pivot shaft 38 is, after passing through the pivot pipe 36, further inserted through the flanged collar 76 and the sixth bolt insertion hole 82 provided in the left step stay 28L in this order, and is fastened with a nut 84.

Consequently, the left and right swingarms 12, 12 are supported by the left and right swingarm brackets 9L, 9R through the roller bearings 78, 68 and the pivot 16, and the upper portions of the left and right step stays 28L, 28R are supported by the left and right swingarm brackets 9L, 9R.

First and second reinforcement members 86, 88, made of a plate material, are respectively fixed by welding to the inner surfaces of the inner bracket halves of the left and right swingarm brackets 9L, 9R, that is, the inner surface of the right bracket half 34 of the left swingarm bracket 9L and the inner surface of the left bracket half 32 of the right swingarm bracket 9R.

Third and fourth reinforcement members 85, 87, made of a plate material, are respectively fixed by welding to the inner surfaces of the outer bracket halves of the left and right swingarm brackets 9L, 9R, that is, the inner surface (right side surface) of the left bracket half 32 of the left swingarm bracket 9L and the inner surface (left side surface) of the right bracket half 34 of the right swingarm bracket 9R. In other words, the thickness of each of the opposing portions 320, 340 around the pivot 16 is set to be larger than the thickness of the remaining portions thereof.

The reinforcement members 85 to 88 reinforce the joining portions between the swingarm brackets 9L, 9R and the pivot pipe 36. Preferably, the reinforcement members 85 to 88 are formed so as to cover half or more of the outer circumference of the pivot pipe 36. The reinforcement members 85 to 88 are welded to the inner surfaces (opposing surfaces) of the opposing portions 320, 340, and thus are not seen from the outside of the vehicle body. This results in an enhanced appearance. In the present embodiment, the reinforcement members 85 to 88 made of a plate material are joined to the bracket halves 32, 34. However, for example, in the case where the bracket halves 32, 34 are molded articles, the reinforcement members 85 to 88 may be integrally formed such that the thickness around the pivot 16 is larger than the thickness of the remaining portions.

Figure 9:
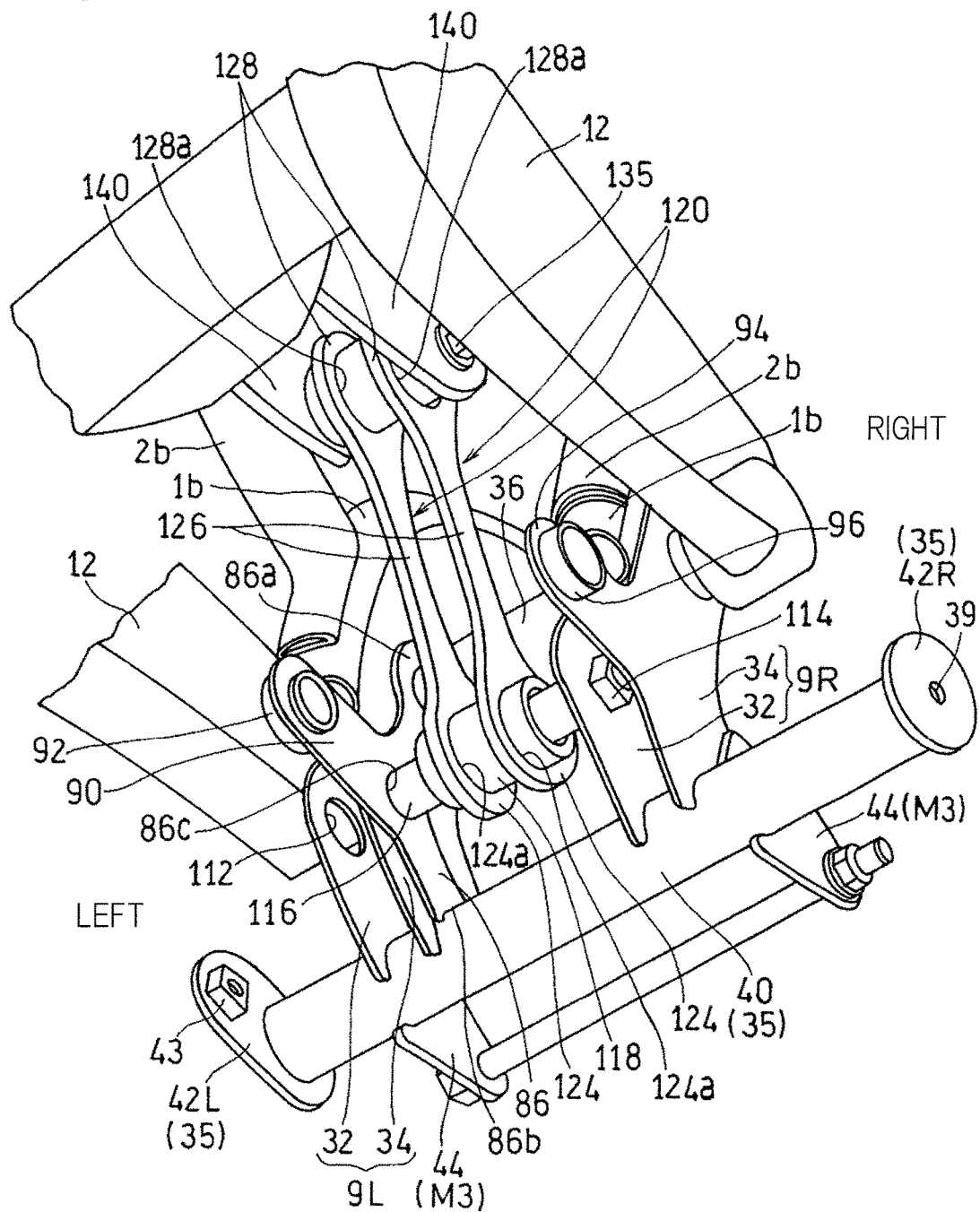
FIG. 9 is a perspective view of the swingarm support structure as viewed from the rear and obliquely below.

As shown in FIG. 9, the first reinforcement member 86 on the left side includes at an upper end portion 86a configured to reinforce the joining portion of the right bracket half 34 of the left swingarm bracket 9L and the pivot pipe 36. More specifically, the upper end portion 86a of the first reinforcement member 86 is formed so as to cover half or more of the outer circumference of the pivot pipe 36. The first reinforcement member 86 extends downward from the upper end portion 86a thereof, and is fixed at a lower end portion 86b thereof to the pipe member 40 of the lower cross member 35 by welding.

The first reinforcement member 86 includes a first extending piece 90 extending rearward from its intermediate portion in the vertical direction. A first muffler attachment portion 92 on the left side is formed at a rear end portion of the first extending piece 90. The first muffler attachment portion 92 is formed by fixing a tubular member having an axis in the vehicle widthwise direction to the rear end portion of the first extending piece 90 by welding.

Since the reinforcement members 86, 88 extend from the pivot pipe 36 to the lower cross member 35, a closed-loop structure can be formed by the reinforcement members 86, 88, the pivot pipe 36 and the lower cross member 35, making it possible to further inhibit deformation of the swingarm brackets 9L, 9R.

Here, the reinforcement members 86, 88 can be regarded as parts of the swingarm brackets 9L, 9R. Instead of using the reinforcement members 86, 88, the thicknesses of the bracket halves 32, 34 may be partially increased in the region in which the reinforcement members 86, 88 are to be attached. This can also achieve the required rigidity, while preventing an increase in the overall thickness. In other word, it is possible to prevent excessive or insufficient rigidity.

The rigidities of the swingarm brackets 9L, 9R are increased by coupling the left and right swingarm brackets 9L, 9R through the reinforcement members 86, 88 and a pipe 102. The rigidities of the swingarm brackets 9L, 9R are increased also by coupling the left and right swingarm brackets 9L, 9R through the reinforcement members 86, 88 and an intermediate cross member 116. Furthermore, by coupling the bracket halves 34, 32, located inward in the vehicle widthwise direction, of the pair of bracket halves 32, 34 by the intermediate cross member 116, it is possible to prevent a sixth threaded hole 114 from being exposed to the outer side in the vehicle widthwise direction from the bracket halves 32, 34 located outward in the vehicle widthwise direction, thus enhancing the appearance.

The pipe 102 is supported by the first reinforcement member 86 of the left swingarm bracket 9L and the right bracket half 34 of the right swingarm bracket 9R. Accordingly, it is easy to form a pipe supporting portion to the right, making it easy to prevent interference between the exhaust muffler 24 and the other components. Also, the exhaust muffler 24 and the exhaust pipe 22 passing through the right side of the vehicle body are easily connected. Furthermore, since the pair of swingarm brackets 9L, 9R are disposed so as to be spaced apart in the vehicle widthwise direction, a linkage, which will be described later, is easily disposed between the pair of swingarm brackets 9L, 9R.

A second muffler attachment portion 96 on the right side is formed on the right bracket half 34 of the right swingarm bracket 9R. More specifically, a second extending piece 94 extending rearward is formed on the bracket half 34 of the right swingarm bracket 9R, and a tubular member having an axis in the vehicle widthwise direction is fixed by welding to a rear end portion of the second extending piece 94, and thereby, the second muffler attachment portion 96 on the right side is formed.

As shown in FIG. 8, a tubular elastic member 98 having flanges at opposite ends thereof, such as a grommet, is attached to each of the first and second muffler attachment portions 92, 96. A pair of left and right attachment pieces 100, 100 are attached to the upper surface of the exhaust muffler 24 (FIG. 1). Each attachment piece 100 is provided with a through hole 100a directed in the vehicle widthwise direction. The pipe 102 extending in the vehicle widthwise direction is disposed concentrically with the respective through holes 100a, and is fixed to the attachment pieces 100 by welding.

Figure 11:
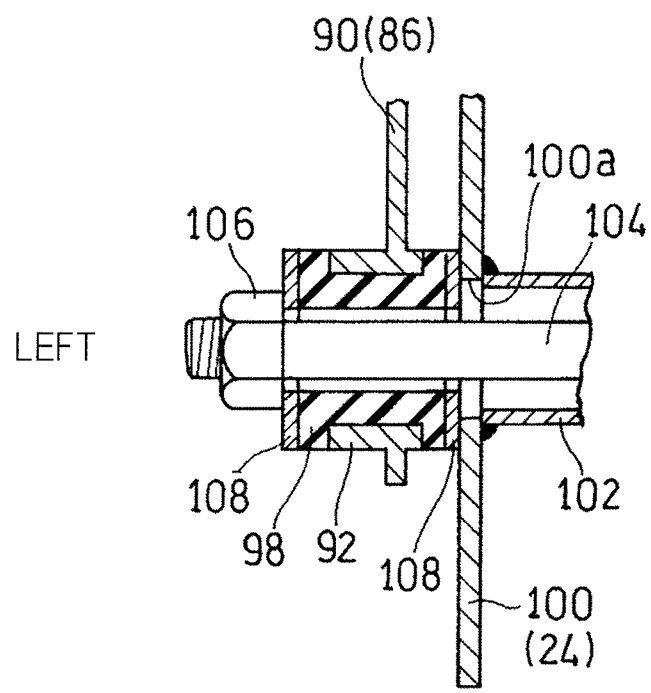
FIG. 11 is a partially enlarged cross-sectional view of the swingarm support structure.

As shown in FIG. 11, a bolt 104 is inserted, from the right side in the vehicle widthwise direction, through the elastic member 98 on the second muffler attachment portion 96, the inside of the pipe 102 and the elastic member 98 on the first muffler attachment portion 92 in this order, and is thereafter fastened with a nut 106. Consequently, the exhaust muffler 24 (FIG. 1) is supported by the swingarm brackets 9L, 9R. Washers 108 are interposed between a head 104a of the bolt 104 and the elastic member 98, between each attachment piece 100 and the corresponding elastic member 98, and between the nut 106 and the elastic member 98.

Figure 6:
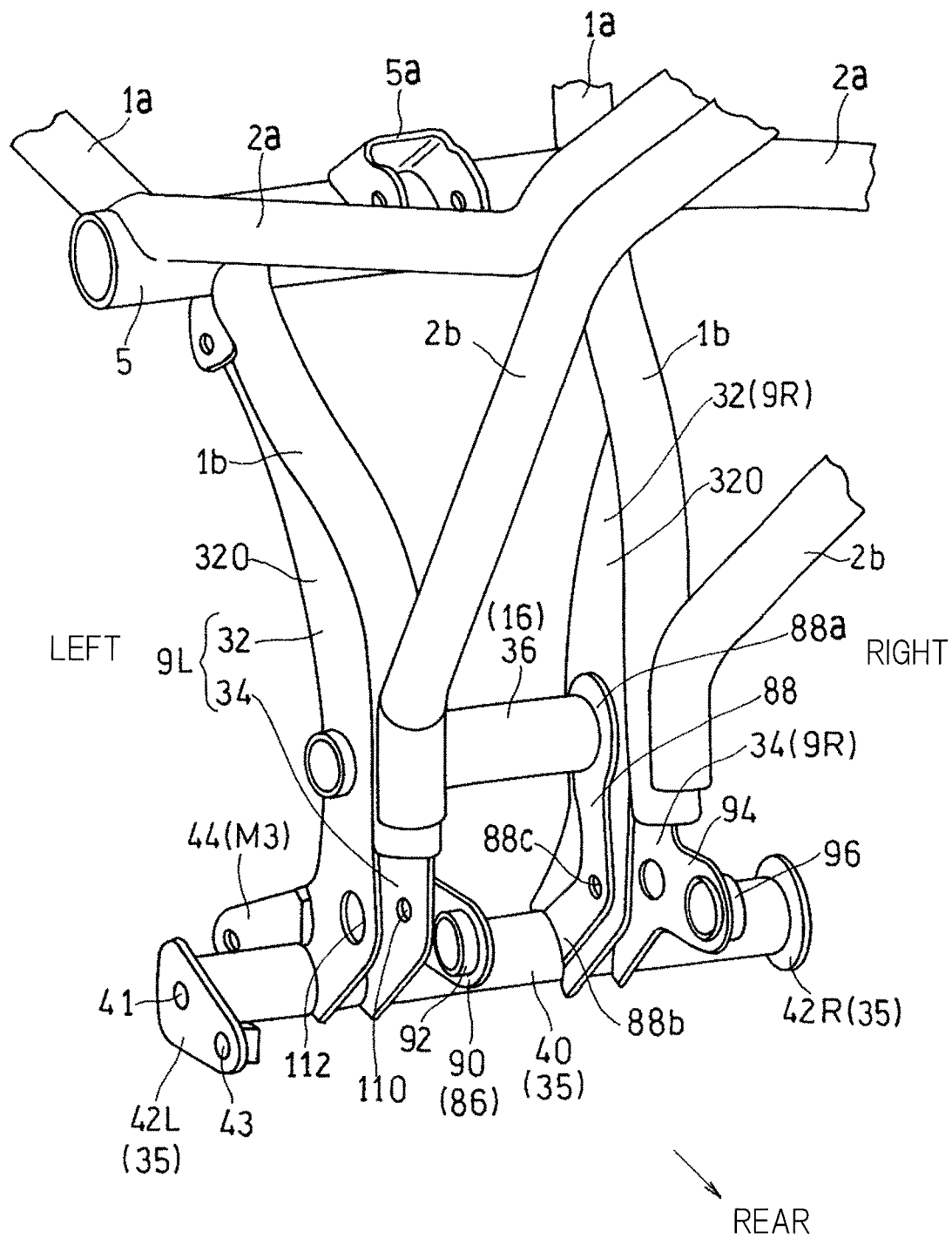
FIG. 6 is a rear perspective view showing the lower portion of the vehicle body frame.

As shown in FIG. 9, a first shaft insertion hole 86c directed in the vehicle widthwise direction is formed in an intermediate portion of the first reinforcement member 86 in the vertical direction. A second shaft insertion hole 110 (FIG. 6) is formed in the right bracket half 34 of the left swingarm bracket 9L at a position corresponding to the first shaft insertion hole 86c. Furthermore, a through hole 112 is formed in the left bracket half 32 of the left swingarm bracket 9L at a position corresponding to the second shaft insertion hole 110 (FIG. 6). The through hole 112 has a diameter that is sufficiently larger than the diameter of each of the first and second shaft insertion holes 86c, 110.

As shown in FIG. 6, the second reinforcement member 88 on the right side includes an upper end portion 88a configured to reinforce the joining portion of the left bracket half 32 of the right swingarm bracket 9R and the pivot pipe 36. More specifically, the upper end portion 88a of the second reinforcement member 88 is formed so as to cover half or more of the outer circumference of the pivot pipe 36. The second reinforcement member 88 extends downward from the upper end portion 88a thereof, and is fixed at a lower end portion 88b thereof to the pipe member 40 of the lower cross member 35 by welding.

A third shaft insertion hole 88c directed in the vehicle widthwise direction is formed in an intermediate portion of the second reinforcement member 88 in the vertical direction. The sixth threaded hole 114 is formed in the left bracket half 32 of the right swingarm bracket 9R shown in FIG. 9 at a position corresponding to the third shaft insertion hole 88c (FIG. 6). The sixth threaded hole 114 of the present embodiment is formed by a weld nut.

The intermediate cross member 116, made of a cylindrical pipe extending in the vehicle widthwise direction, is provided between the left and right swingarm brackets 9L, 9R at a position corresponding to the first shaft insertion hole 86c of the first reinforcement member 86 and the third shaft insertion hole 88c (FIG. 6) of the second reinforcement member 88. In other words, the inside of the intermediate cross member 116 is in communication with the first shaft insertion hole 86c of the first reinforcement member 86 and the third shaft insertion hole 88c of the second reinforcement member 88. The intermediate cross member 116 couples the right bracket half 34, located inward in the vehicle widthwise direction, of the left swingarm bracket 9L and the left bracket half 32, located inward in the vehicle widthwise direction, of the right swingarm bracket 9R.

The intermediate cross member 116 is fitted into a through hole of a tubular rod support portion 118 that supports pull rods 120, which will be described later. The intermediate cross member 116 is disposed between the left and right swingarm brackets 9L, 9R while being combined with the rod support portion 118 and the pull rods 120. In this state, a bolt 122 (FIG. 4) is inserted, from the outer side in the vehicle widthwise direction (left side), through the second shaft insertion hole 110 (FIG. 6), the first shaft insertion hole 86c, a through hole of the intermediate cross member 116, and the third shaft insertion hole 88c in this order, and is thereafter fastened to the sixth threaded hole 114. Consequently, the intermediate cross member 116 is removably supported by the swingarm brackets 9L, 9R. In other words, the weld nut (sixth threaded hole) 114 constitutes a fixing portion that supports the pull rods 120 to the swingarm brackets 9L, 9R through the intermediate cross member 116.

Since the through hole 112 having a larger diameter is provided in the bracket half 32, located outward in the vehicle widthwise direction, of the left swingarm bracket 9L, the bolt 122 can be readily operated via the through hole 112. Accordingly, an attachment operation and a replacement operation for the intermediate cross member 116 and the pull rods 120 are facilitated. Since the portions of the swingarm brackets 9L, 9R at which the intermediate cross member 116 is provided are reinforced by the first and second reinforcement members 86, 88, the intermediate cross member 116 can be stably supported.

One end portion (lower portion) of each of the pair of left and right pull rods 120 is supported by the rod support portion 118. The pull rods 120 are a kind of vehicle-body-mounted components supported by the intermediate cross member 116, and constitute a part of the linkage for the rear suspension 30.

Figure 10:
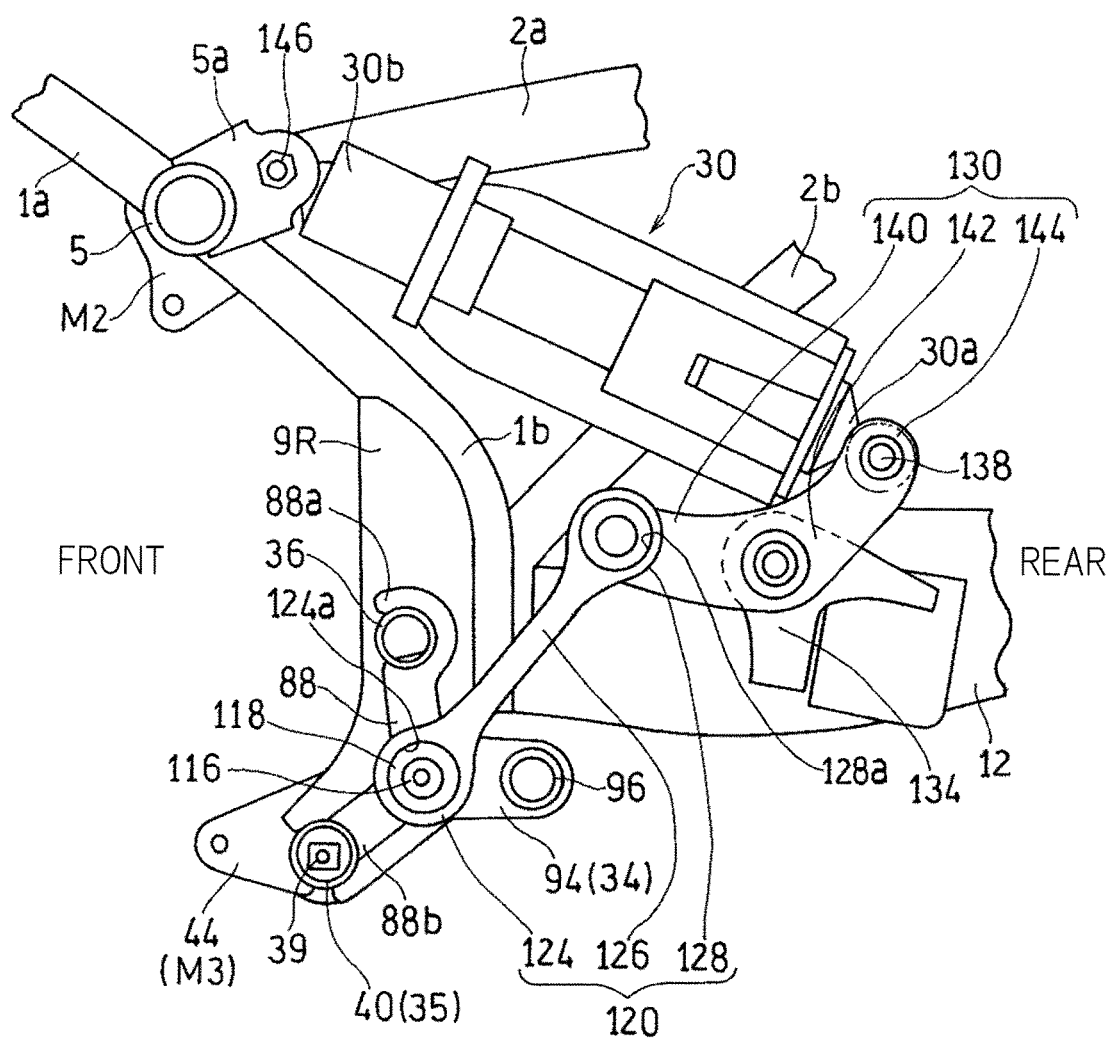
FIG. 10 is a side view showing a linkage for a rear suspension of the motorcycle.

FIG. 10 shows a state in which the right body frame FR is viewed from the inner side, with the left body frame FR omitted. As shown in FIG. 10, each pull rod 120 includes a to-be-supported portion 124 coupled to the rod support portion 118, a rod arm portion 126 extending obliquely upward and rearward from the to-be-supported portion 124 at a proximal end thereof, and a link coupling portion 128 provided at a distal end (upper end) of the rod arm portion 126. The to-be-supported portion 124 and the link coupling portion 128 respectively have first and second support portion insertion holes 124a, 128a directed in the vehicle widthwise direction.

The rod support portion 118 is inserted through the first support portion insertion hole 124a of each to-be-supported portion 124. In other words, lower portions of the pull rods 120 are pivotably supported by the swingarm brackets 9L, 9R through the rod support portion 118 and the intermediate cross member 116.

An upper portion of each pull rod 120 is supported by the swingarm 12 through a pair of left and right link arms 130. More specifically, each link arm 130 is coupled to the upper portion of the pull rod 120 through the link coupling portion 128 by using a bolt 135 (FIG. 4) so as to be relatively rotatable. Each link arm 130 includes a pull rod coupling portion 140 coupled to the pull rod 120, a swingarm coupling portion 142 coupled to the swingarm 12, and a rear suspension coupling portion 144 coupled to the rear suspension 30.

The pull rod coupling portion 140 is located outward of the link coupling portion 128 in the vehicle widthwise direction, and is coupled to the link coupling portion 128 by using the bolt 135 (FIG. 4) so as to be relatively rotatable. The swingarm coupling portion 142 is coupled to an arm attachment piece 134 provided on the swingarm 12 by using a bolt 136 (FIG. 4) so as to be relatively rotatable. The rear suspension coupling portion 144 is located rearward of the pull rod coupling portion 140. A lower end portion 30a of the rear suspension 30 is coupled to the rear suspension coupling portion 144 by using a bolt 138 (FIG. 4) so as to be relatively rotatable.

An upper end portion 30b of the rear suspension 30 is coupled to a rear suspension attachment piece 5a provided on the upper cross member 5 by using a bolt 146 so as to be relatively rotatable. In this manner, the pull rods 120 and the link arms 130 cooperate together to form the linkage for the rear suspension 30.

With the above-described configuration, as shown in FIG. 4, the swingarms 12, 12 are supported by the swingarm brackets 9L, 9R outward of the swingarm brackets 9L, 9R. This can reduce the dimension of the rear portion of the vehicle body in the widthwise direction, and therefore, the vehicle body can be slimmed.

Each of the pair of left and right swingarm brackets 9L, 9R includes the left and right bracket halves 32, 34 including the opposing portions 320, 340, and the pivot 16 that supports the swingarms 12 is supported by the four bracket halves 32, 32, 34, 34. This makes it possible to increase the rigidity of a required area simply by increasing only the thickness of required one of the four bracket halves 32, 32, 34, 34, without increasing the overall thicknesses of the swingarm brackets 9L, 9R. As a result, it is possible to slim the vehicle body, and effectively ensure the required supporting rigidity while suppressing a weight increase of the swingarm brackets 9L, 9R.

In a state in which the left and right bracket halves 32, 34 are coupled to each other by welding at the coupling portions 32*a*, 34*a* of the front portions thereof, the left and right bracket halves 32, 34 are fixed to the vertical frame piece 1*b* by welding at the rear portions thereof. This effectively inhibits deformation of the bracket halves 32, 34 including the opposing portions 320, 340, thus increasing the supporting rigidity for the swingarms 12.

Each vertical frame piece 1*b* extends to a location of the bracket halves 32, 34 below the pivot 16. Accordingly, the vertical frame pieces 1*b* increase the supporting rigidity of the bracket halves 32, 34 for the swingarms 12.

The left and right bracket halves 32, 34 have rigidities different with each other. More specifically, the thickness of one bracket half located outward in the vehicle widthwise direction, of the left and right bracket halves 32, 34, is set to be larger than the thickness of the bracket half located inward. This effectively increases the rigidity of required one of the bracket halves, thus making it possible to suppress a weight increase.

The rigidity of the left swingarm bracket 9L at which the power transmission mechanism 11 is disposed is set to be higher than the rigidity of the right swingarm bracket 9R. More specifically, as shown in FIG. 2, the projected area of the left swingarm bracket 9L is set to be larger in side view than the projected area of the right swingarm bracket 9R. This can increase the rigidity of the left swingarm bracket 9L that receives a load from the power transmission mechanism 11.

As shown in FIG. 9, the pull rods 120 are supported by the intermediate cross member 116 that couples together the bracket halves 34, 32, located inward in the vehicle widthwise direction, of the left and right swingarm brackets 9L, 9R. With this configuration, fitting members such as the welding nut 114 are disposed inward of the swingarm brackets 9L, 9R, and therefore, the fitting members cannot be easily seen from the outside, thus achieving a good appearance.

The intermediate cross member 116 that supports the pull rods 120 couples the left and right swingarm brackets 9L, 9R. This increases the rigidity of the left and right swingarm brackets 9L, 9R without increasing the overall thicknesses of the left and right swingarm brackets 9L, 9R.

The fixing portion (weld nut 114) that supports the pull rods 120, which are a kind of vehicle-body-mounted components, is formed on the right swingarm bracket 9R. Since each of the swingarm brackets 9L, 9R is formed by joining the left and right bracket halves 32, 34, it is possible to increase the rigidity of only the left bracket half 32 of the right swingarm bracket 9R on which the fixing portion is formed. This can increase the rigidity of a required area, without increasing the overall thicknesses of the swingarm brackets 9L, 9R.

The step stays 28 are coupled to the pivot 16. This allows the fixation of the pivot 16 and the fixation of the step stays 28 to be performed in common, thus making it possible to reduce the number of components and also achieve a weight reduction.

As shown in FIG. 8, the first to fourth reinforcement members 85 to 88 are fixed to the opposing surfaces of the respective bracket halves 32, 34 by welding. Consequently, the thickness of each of the opposing portions 320, 340 around the pivot 16 is set to be larger than the thickness of the remaining portions thereof. In this manner, increasing the thickness around the pivot 16 facilitates welding of the pivot pipe 36 to the opposing portions 320, 340. Partially increasing the thicknesses of the opposing portions 320, 340 can reduce the weights of the swingarm brackets 9L, 9R while increasing the strength of a required area, without increasing the overall thicknesses of the swingarm brackets 9L, 9R.

In the above-described embodiment, the first and second reinforcement members 86, 88 are fixed by welding to the inner surfaces of the bracket halves 32, 34 located inward in the vehicle widthwise direction. This can also effectively increase the rigidity of a required area of the swingarm brackets 9L, 9R. Specifically, the first and second reinforcement members 86, 88 are provided on the swingarm brackets 9L, 9R at portions that support the pivot 16 and portions that support the intermediate cross member 116.

The first and second muffler attachment portions 92, 96 are respectively provided integrally to the first reinforcement member 86 and the right bracket half 34 of the right swingarm bracket 9R, and a portion of the linkage for the rear suspension 30 is supported by the intermediate cross member 116 removably attached to the swingarm brackets 9L, 9R. The swingarm brackets 9L, 9R of the above-described embodiment include the left and right bracket halves 32, 34 including the opposing portions 320, 340, and therefore, reinforcement members, a stay for supporting components to be mounted on the vehicle body or the like are easily attached thereto.

Furthermore, one of the bracket halves 32, 34 may be formed to have a plate shape, and the other may be formed to have a substantially L-shaped cross section perpendicular to the vertical direction. Instead of being formed by combining the two bracket halves 32, 34, the swingarm brackets 9L, 9R may be formed by combining three or more bracket members. The swingarm brackets 9L, 9R may be formed by a single member so as to have an L-shaped cross section.

The present invention is not limited to the embodiment described above, and various additions, modifications, or deletions may be made without departing from the gist of the invention. For example, although the swingarm brackets 9 are formed frontward of the vertical frame pieces 1*b* in the above-described embodiment, the swingarm brackets 9 may be formed rearward thereof. The coupling portions that couple the left and right plate members may be omitted. Although the embodiment uses the pull rods 120 as the vehicle-body-mounted components supported by the intermediate cross member 116, the vehicle-body-mounted components are not limited thereto, and may be, for example, an exhaust muffler, an engine, a side stand, a step stay or the like. Therefore, these are construed as included within the scope of the present invention.

REFERENCE NUMERALS

1b . . . vertical frame piece
9L, 9R . . . swingarm bracket
11 . . . power transmission mechanism (drive chain)
12 . . . swingarm
14 . . . rear wheel
16 . . . pivot
320, 340 . . . opposing portion
32a, 34a . . . coupling portion
116 . . . intermediate cross member (cross member, support member)
120 . . . pull rod (vehicle-body-mounted component)
FR . . . vehicle body frame

What is claimed is:

1. A swingarm support structure configured to support, on a vehicle body frame, a swingarm that supports a rear wheel, the swingarm support structure comprising:
a pair of left and right vertical frame pieces constituting a part of the vehicle body frame and extending in a vertical direction;
a pair of left and right swingarm brackets fixed to the pair of left and right vertical frame pieces, respectively; and
a pivot supported by the swingarm brackets and configured to swingably support the swingarm outward in a vehicle widthwise direction of the swingarm brackets, wherein
each of the pair of left and right swingarm brackets includes left and right opposing portions disposed so as to be spaced apart in the vehicle widthwise direction; and a plate-like coupling portion configured to couple the left and right opposing portions,
the pivot is supported by each of the left and right opposing portions at each of the swingarm brackets,
the left and right vertical frame pieces are each composed of a pipe,
each of the swingarm brackets has a substantially U-shaped cross section perpendicular to the vertical direction, and extends in the vertical direction, and
the left and right vertical frame pieces are jointed to rear surfaces of the left and right swingarm brackets, respectively.

2. The swingarm support structure as claimed in claim 1, wherein the left and right opposing portions have rigidities different with each other.

3. The swingarm support structure as claimed in claim 1, further comprising a cross member extending in the vehicle widthwise direction and configured to couple together the opposing portions, located inward in the vehicle widthwise direction, of the left and right swingarm brackets, wherein a vehicle-body-mounted component is supported by the cross member.

4. The swingarm support structure as claimed in claim 1, wherein a fixing portion configured to support a vehicle-body-mounted component is formed on the swingarm bracket.

5. The swingarm support structure as claimed in claim 1, wherein a step stay on which a foot of a driver is to be placed is coupled to the pivot.

6. The swingarm support structure as claimed in claim 1, wherein a thickness of each of the opposing portions around the pivot is set to be larger than a thickness of the remaining portions thereof.

7. A swingarm support structure configured to support, on a vehicle body frame, a swingarm that supports a rear wheel, the swingarm support structure comprising:
a pair of left and right vertical frame pieces constituting a part of the vehicle body frame and extending in a vertical direction;
a pair of left and right swingarm brackets fixed to the pair of left and right vertical frame pieces, respectively; and
a pivot supported by the swingarm brackets and configured to swingably support the swingarm outward in a vehicle widthwise direction of the swingarm brackets, wherein
each of the pair of left and right swingarm brackets includes a left and right opposing portions disposed so as to be spaced apart in the vehicle widthwise direction,
the pivot is supported by each of the left and right opposing portions at each of the swingarm brackets, and
the left and right vertical frame pieces extend to locations below the pivot.

8. A swingarm support structure configured to support, on a vehicle body frame, a swingarm that supports a rear wheel, the swingarm support structure comprising:
a pair of left and right vertical frame pieces constituting a part of the vehicle body frame and extending in a vertical direction;
a pair of left and right swingarm brackets fixed to the pair of left and right vertical frame pieces, respectively; and
a pivot supported by the swingarm brackets and configured to swingably support the swingarm outward in a vehicle widthwise direction of the swingarm brackets, wherein
each of the pair of left and right swingarm brackets includes left and right opposing portions disposed so as to be spaced apart in the vehicle widthwise direction,
the pivot is supported by each of the left and right opposing portions at each of the swingarm brackets,
a power transmission mechanism configured to transmit power from a drive source of a motorcycle to the rear wheel is disposed outward of the swingarm bracket in the vehicle widthwise direction, and
a rigidity of one swingarm bracket of the pair of left and right swingarm brackets is set to be higher than a rigidity of the other swingarm bracket, the one swingarm bracket being located on a side on which the power transmission mechanism is disposed.

9. The swingarm support structure as claimed in claim 8, wherein a projected area of the one swingarm bracket is set to be larger in a side view than a projected area of the other swingarm bracket.

10. The swingarm support structure as claimed in claim 8, wherein a thickness of one opposing portion of the left and right opposing portions of the other swingarm bracket is set to be larger than a thickness of the other opposing portion, the one opposing portion being located outward in the vehicle widthwise direction.

11. The swingarm support structure as claimed in claim 8 wherein the left and right vertical frame pieces extend to locations below the pivot.

* * * * *